(12) United States Patent
Ye et al.

(10) Patent No.: US 12,155,073 B2
(45) Date of Patent: Nov. 26, 2024

(54) METHOD FOR PREPARING IRON SULFIDE, CATHODE COMPRISING IRON SULFIDE PREPARED THEREBY FOR LITHIUM SECONDARY BATTERY, AND LITHIUM SECONDARY BATTERY COMPRISING SAME

(71) Applicant: LG CHEM, LTD., Seoul (KR)

(72) Inventors: Seongji Ye, Daejeon (KR); Suenghoon Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 903 days.

(21) Appl. No.: 17/259,215

(22) PCT Filed: Sep. 18, 2019

(86) PCT No.: PCT/KR2019/012089
§ 371 (c)(1),
(2) Date: Jan. 11, 2021

(87) PCT Pub. No.: WO2020/060199
PCT Pub. Date: Mar. 26, 2020

(65) Prior Publication Data
US 2021/0273225 A1    Sep. 2, 2021

(30) Foreign Application Priority Data

Sep. 18, 2018  (KR) .................. 10-2018-0111788
Sep. 18, 2018  (KR) .................. 10-2018-0111792
(Continued)

(51) Int. Cl.
*H01M 4/58*    (2010.01)
*C01G 49/12*   (2006.01)
(Continued)

(52) U.S. Cl.
CPC .......... *H01M 4/5815* (2013.01); *C01G 49/12* (2013.01); *H01M 4/364* (2013.01); *H01M 4/587* (2013.01);
(Continued)

(58) Field of Classification Search
CPC ........................ H01M 4/5815; C01G 49/12
See application file for complete search history.

(56) References Cited

U.S. PATENT DOCUMENTS

| | | |
|---|---|---|
| 2009/0087374 A1 | 4/2009 | Schimek et al. |
| 2009/0104520 A1 | 4/2009 | Marple |

(Continued)

FOREIGN PATENT DOCUMENTS

| | | |
|---|---|---|
| CA | 2 991 225 A1 | 8/2018 |
| CN | 101521279 A | 9/2009 |

(Continued)

OTHER PUBLICATIONS

Wan M et al., Fe(III): S(-II) Concentration Ratio Controls the Pathway and the Kinetics of Pyrite Formation during Sulfidation of Ferric Hydroxides, (2017) Geochimica et Cosmochimica Acta, http://dx.doi.org/10.1016/j.gca.2017.08.036 (Year: 2017).*

(Continued)

*Primary Examiner* — Matthew T Martin
*Assistant Examiner* — Unique Jenevieve Luna
(74) *Attorney, Agent, or Firm* — Birch, Stewart, Kolasch & Birch, LLP

(57) ABSTRACT

A method for preparing an iron sulfide ($FeS_2$) with selective and high purity by a simple process, a positive electrode for a lithium secondary battery including the iron sulfide ($FeS_2$) prepared therefrom, which can adsorb the lithium polysulfide produced during the charging and discharging process of the lithium secondary battery, thereby increasing the charging and discharging efficiency of the battery and (Continued)

improving its lifetime characteristics; and a lithium secondary battery provided with the same.

14 Claims, 6 Drawing Sheets

(30) Foreign Application Priority Data

Sep. 18, 2019 (KR) .................. 10-2019-0114771
Sep. 18, 2019 (KR) .................. 10-2019-0114782

(51) Int. Cl.
  *H01M 4/02* (2006.01)
  *H01M 4/36* (2006.01)
  *H01M 4/587* (2010.01)
  *H01M 10/0525* (2010.01)

(52) U.S. Cl.
  CPC ..... *H01M 10/0525* (2013.01); *C01P 2002/72* (2013.01); *C01P 2002/74* (2013.01); *C01P 2004/03* (2013.01); *C01P 2004/61* (2013.01); *C01P 2004/62* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2011/0223481 | A1 | 9/2011 | Takeuchi et al. |
| 2017/0117547 | A1 | 4/2017 | Fanous et al. |
| 2018/0006298 | A1 | 1/2018 | Takeuchi et al. |
| 2019/0123377 | A1 | 4/2019 | Yang et al. |
| 2019/0245203 | A1 | 8/2019 | Cho et al. |
| 2019/0267625 | A1 | 8/2019 | Lee |

FOREIGN PATENT DOCUMENTS

| | | |
|---|---|---|
| CN | 107482185 A | 12/2017 |
| CN | 107611409 A | 1/2018 |
| EP | 3 222 585 A1 | 9/2017 |
| JP | 8-157221 A | 6/1996 |
| JP | 2010-540387 A | 12/2010 |
| JP | 2011-512613 A | 4/2011 |
| KR | 10-2009-0035704 A | 4/2009 |
| KR | 10-2010-0075977 A | 7/2010 |
| KR | 10-2012-0061916 A | 6/2012 |
| KR | 10-1556804 B1 | 10/2015 |
| KR | 10-2016-0143577 A | 12/2016 |
| KR | 10-2017-0103610 A | 9/2017 |
| KR | 10-2017-0111740 a | 10/2017 |
| KR | 10-2018-0061034 A | 6/2018 |
| KR | 10-2018-0096252 A | 8/2018 |
| KR | 10-2018-0102406 A | 9/2018 |
| WO | WO 2008/013853 A2 | 1/2008 |
| WO | WO2009/028326 A1 | 3/2009 |
| WO | WO 2011/025538 A1 | 3/2011 |
| WO | WO 2016/080443 A1 | 5/2016 |
| WO | WO 2018/084449 A2 | 5/2018 |
| WO | WO 2018/164413 A1 | 9/2018 |

OTHER PUBLICATIONS

Chen et al., "Single-Source Approach to Cubic FeS2 Crystallites and Their Optical and Electrochemical Properties", Inorganic Chemistry, vol. 44, No. 4, 2005, pp. 951-954.
Chen et al., "Synthesis of Pure Micro- and Nanopyrite and Their Application for As (III) Removal from Aqueous Solution", Advances in Materials Science and Engineering, vol. 2016, Article ID 6290420, 2016, pp. 1-6 (Total No. PP. 7).
International Search Report issued in PCT/KR2019/012089 (PCT/ISA/210), dated Dec. 26, 2019.
Extended European Search Report for European Application No. 19863940.3, dated Jul. 28, 2021.
Sun et al., "Interaction of FeS2 and Sulfur in Li-S Battery System; Focus Issue of Selected Papers from IMLB 2016 with Invited Papers Celebrating 25 Years of Lithium Ion Batteries," Journal of The Electrochemical Society, vol. 164, No. 1, Sep. 9, 2016, pp. 6039-6046.
Zhang et al., "Electrochemical Verification of the Redox Mechanism of FeS2 in a Rechargeable Lithium Battery," Electrochimica Acta, vol. 176, Jul. 26, 2015, pp. 784-789.

* cited by examiner

[Figure 1]
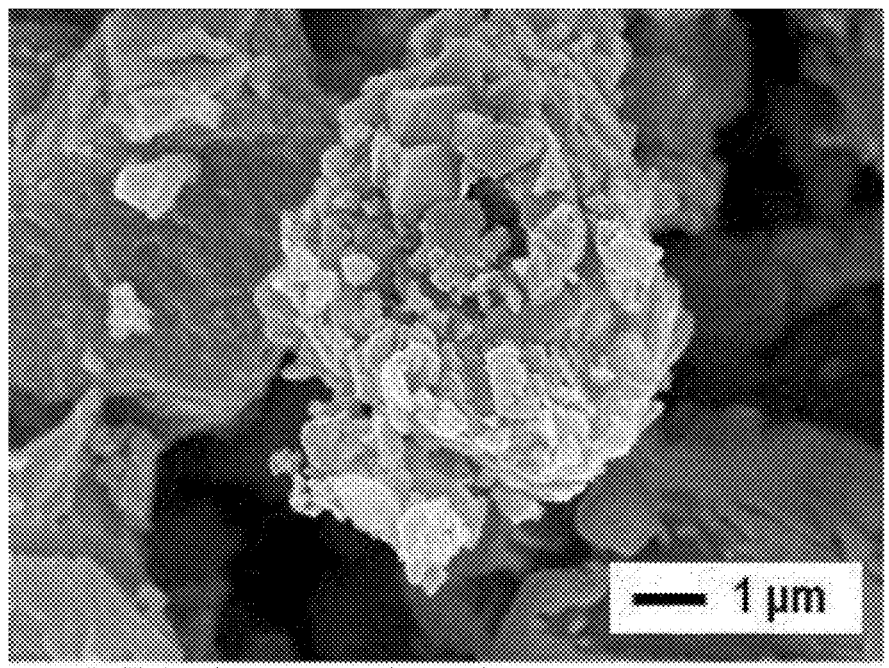
[Figure 2]
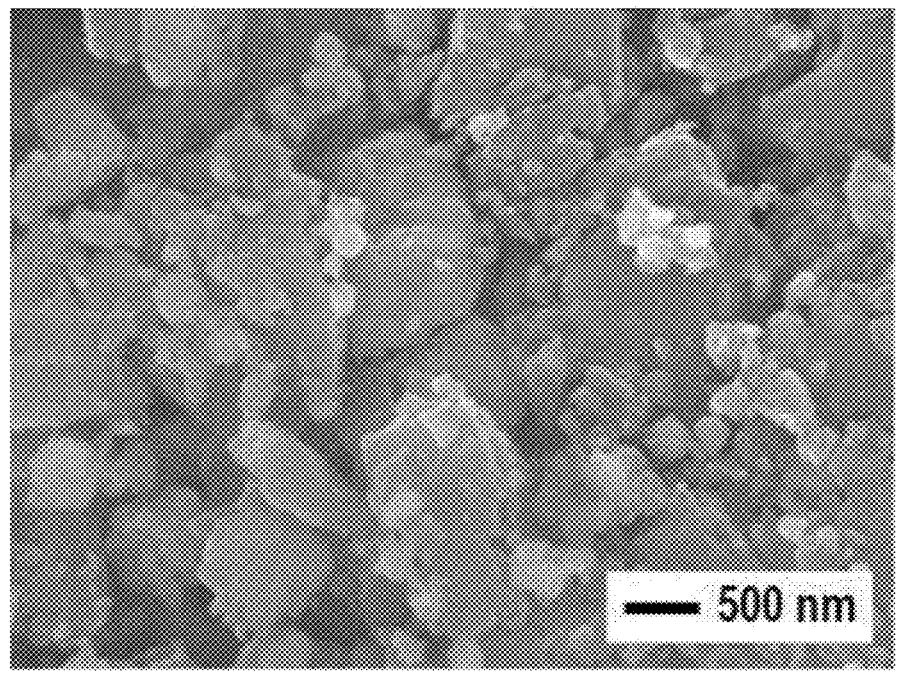

[Figure 3]
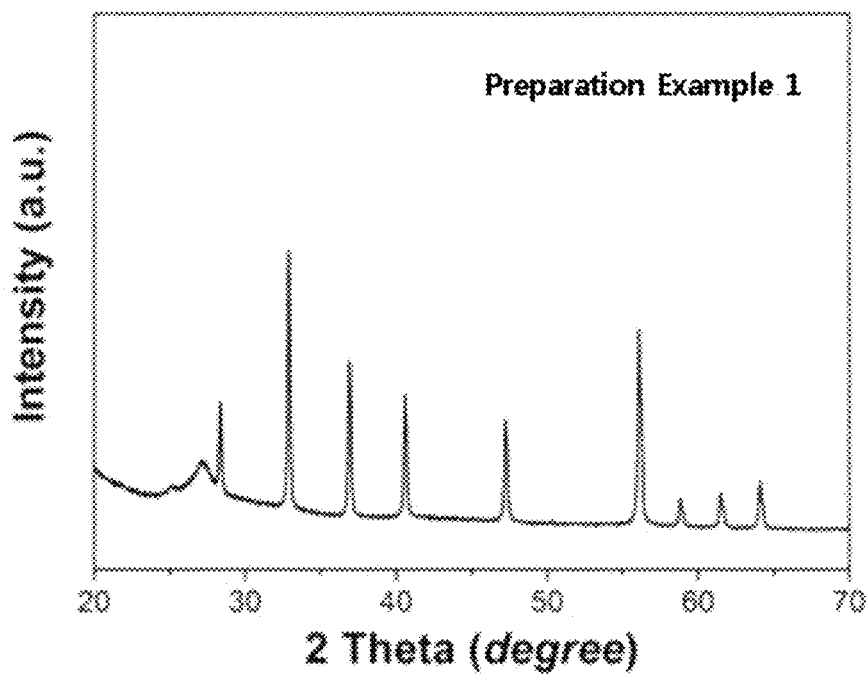
[Figure 4]
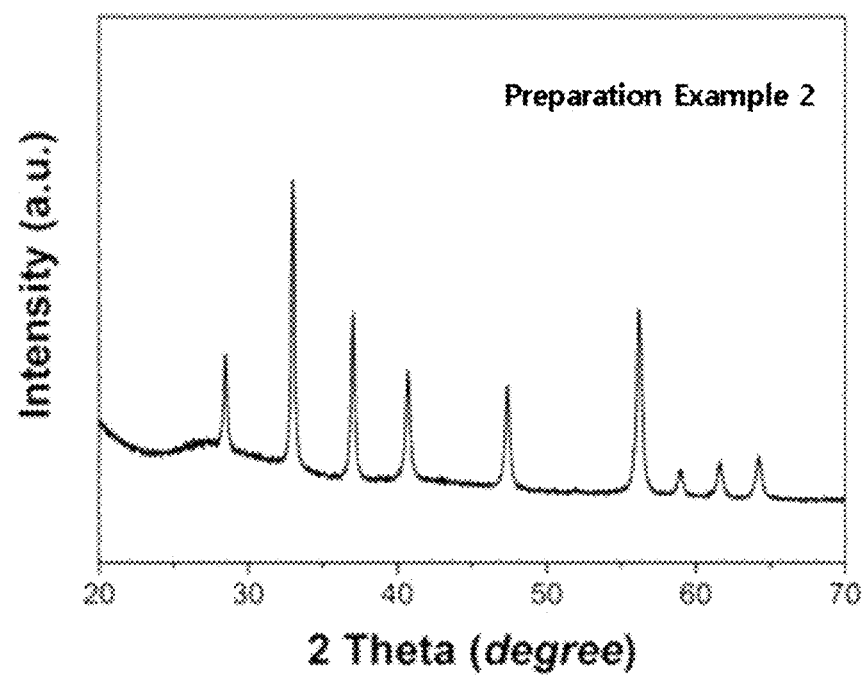

[Figure 5]
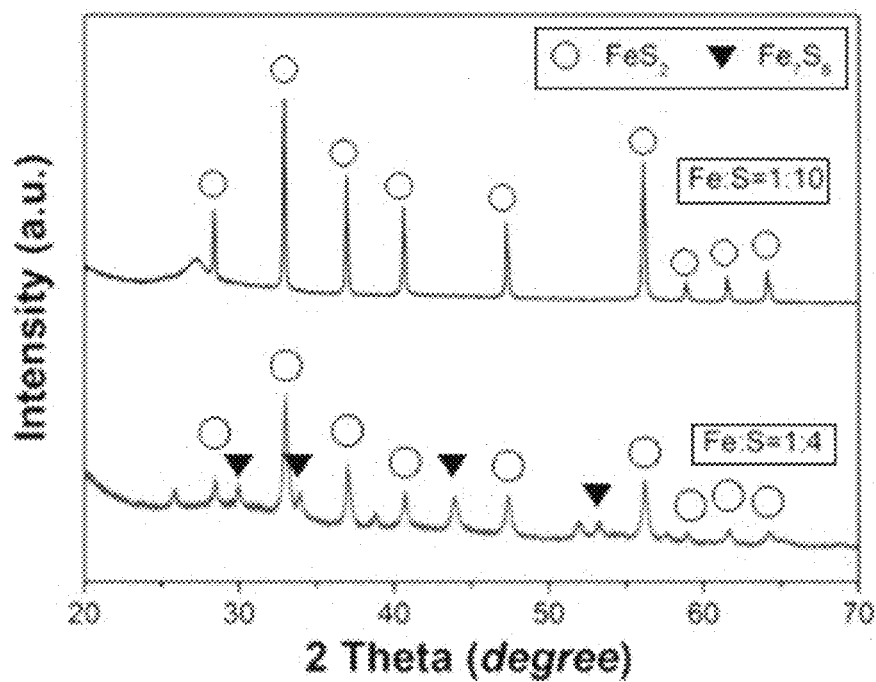
[Figure 6]
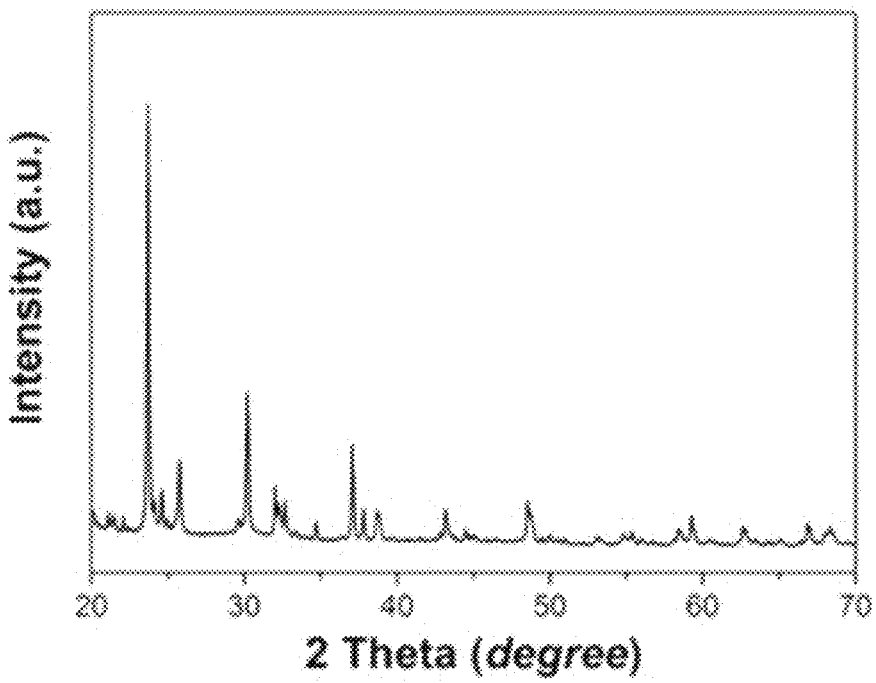

[Figure 7]
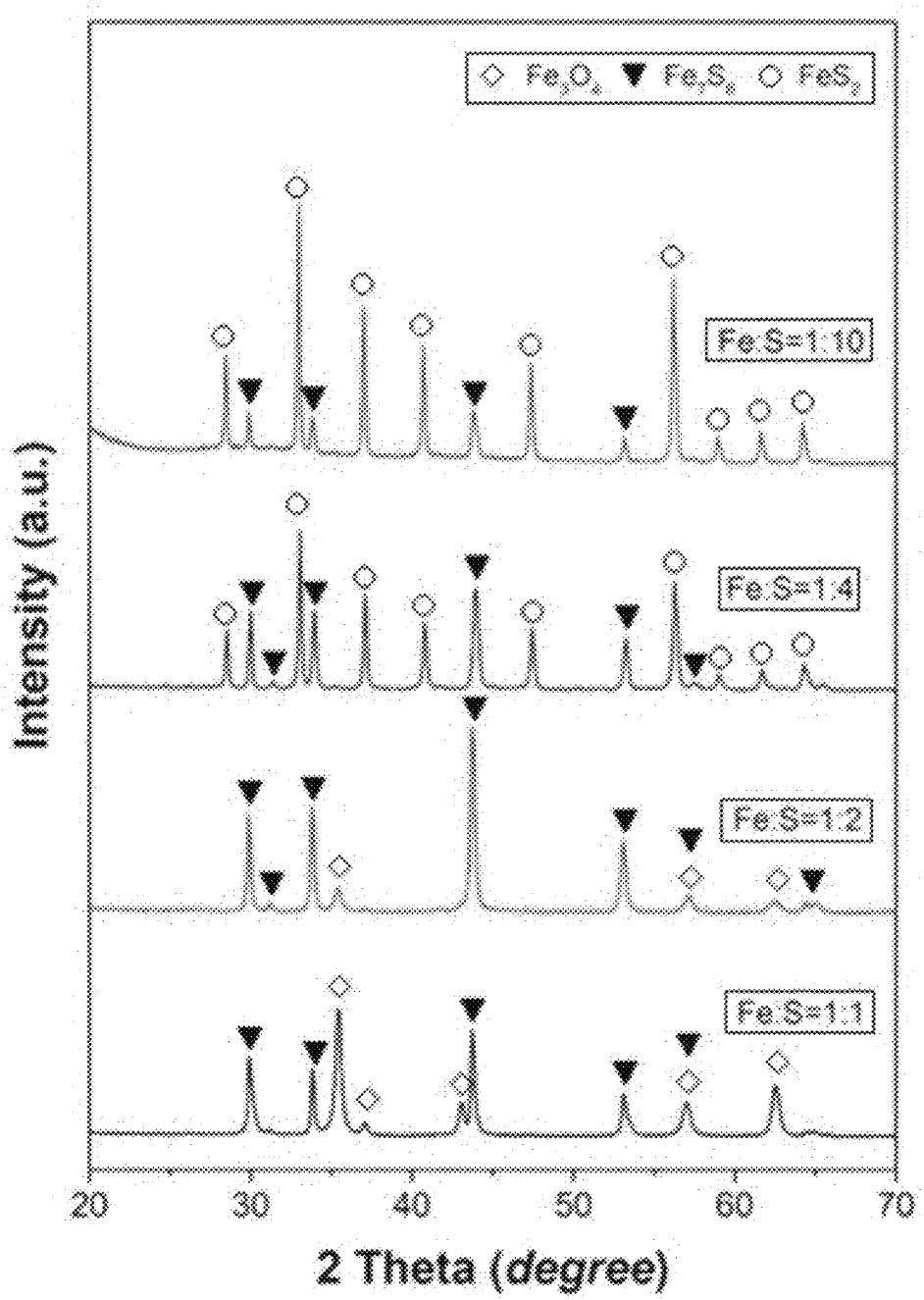

[Figure 8]
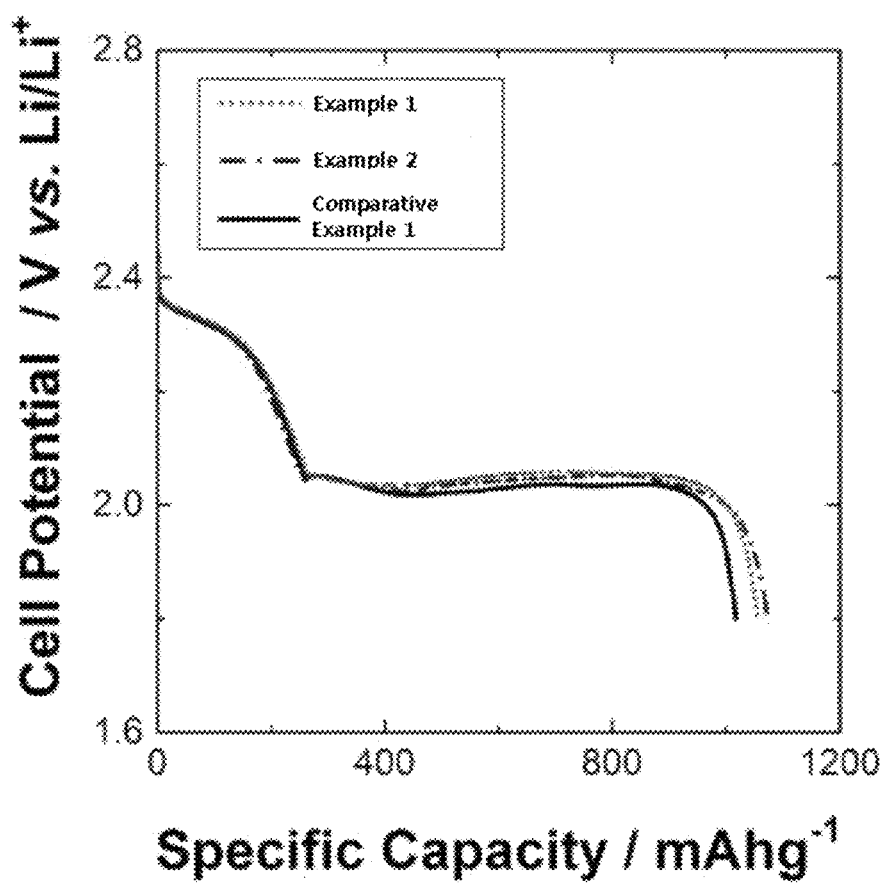

[Figure 9]
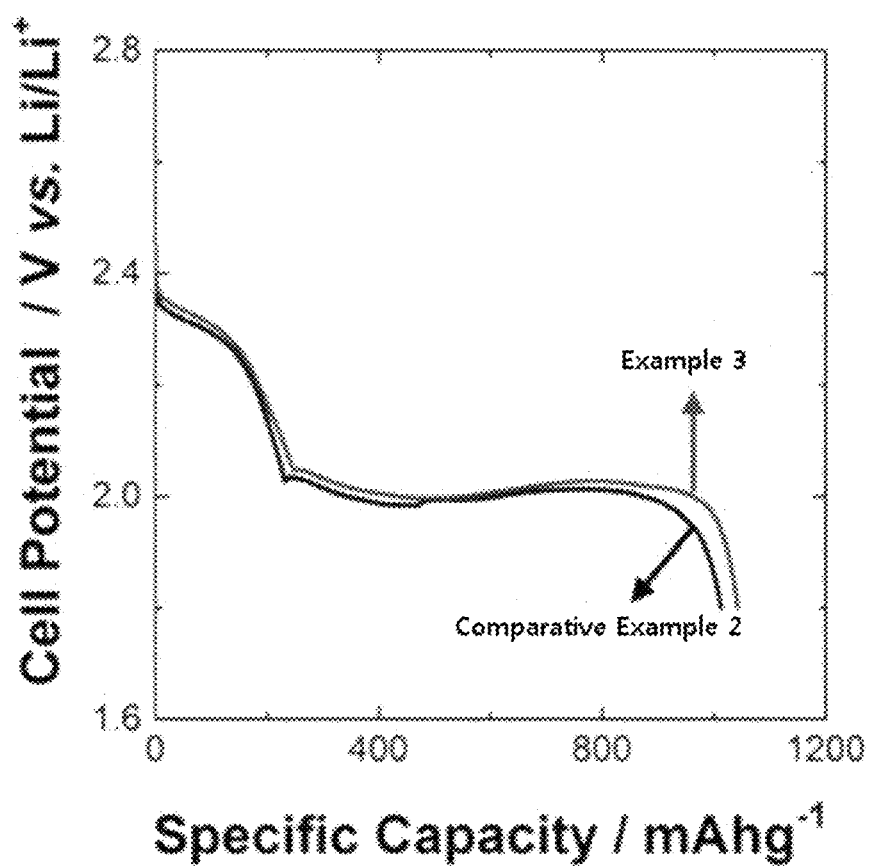

METHOD FOR PREPARING IRON SULFIDE, CATHODE COMPRISING IRON SULFIDE PREPARED THEREBY FOR LITHIUM SECONDARY BATTERY, AND LITHIUM SECONDARY BATTERY COMPRISING SAME

TECHNICAL FIELD

This application claims the benefits of priorities based on Korean Patent Application No. 10-2018-0111788 filed on Sep. 18, 2018, Korean Patent Application No. 10-2019-0114771 filed on Sep. 18, 2019, Korean Patent Application No. 10-2018-0111792 filed on Sep. 18, 2018, and Korean Patent Application No. 10-2019-0114782 filed on Sep. 18, 2019, the entire contents of which are incorporated herein by reference.

The present invention relates to a method for preparing iron sulfide, a positive electrode for a lithium secondary battery comprising the iron sulfide prepared therefrom, and a lithium secondary battery provided with the same, and more particularly to a method for preparing iron sulfide ($FeS_2$) applicable as a positive electrode additive of a lithium secondary battery, which is capable of producing iron sulfide with selective and high purity by a simple process and is applicable as a positive electrode additive of a lithium secondary battery; a positive electrode for a lithium secondary battery comprising the iron sulfide prepared therefrom, which can adsorb the lithium polysulfide produced during the charging and discharging process of the lithium secondary battery, thereby increasing the charging and discharging efficiency of the battery and improving its lifetime characteristics; and a lithium secondary battery provided with the same.

BACKGROUND ART

Secondary batteries have become important electronic components for portable electronic devices since the 1990s as an electric storage device capable of continuously charging and discharging unlike the primary battery which can only discharge once. In particular, since a lithium secondary battery was commercialized by Sony in Japan in 1992, it has led the information age as a key component of portable electronic devices such as smart phones, digital cameras, and notebook computers.

In recent years, lithium secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and large-scale electric power storage systems (ESS), while further widening application area.

However, the lithium secondary battery, which has the best characteristics among the secondary batteries known to date, has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the capacity of the battery is determined by the positive and negative electrode materials, the lithium secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur secondary battery is a new high capacity and low-cost battery system which goes beyond capacity limits determined by the intercalation/deintercalation reaction of lithium ions to the layered structure of the metal oxide and graphite which is the basic principle of existing lithium secondary battery, and which can lead to replacement of transition metals and cost savings.

The lithium-sulfur secondary battery has a theoretical capacity of 1,675 mAh/g derived from a conversion reaction of lithium ion and sulfur ($S_8 + 16Li^+ + 16\ e^- \rightarrow 8Li_2S$) in the positive electrode, and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the theoretical energy density of 400 Wh/kg of commercially available lithium secondary battery ($LiCoO_2$/graphite) which uses layered metal oxides and graphite.

After the lithium-sulfur secondary battery was found to be able to dramatically improve battery performance through the formation of nanocomposites around 2010, the lithium secondary battery is attracting attention as a new high capacity, eco-friendly, low-cost lithium secondary battery and is currently being studied intensively around the world as a next-generation battery system.

One of the main problems of the lithium-sulfur secondary battery revealed to date is that since sulfur has an electrical conductivity of about $5.0 \times 10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with a conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8 \rightarrow Li_2S_8 \rightarrow (Li_2S_6) \rightarrow Li_2S_4 \rightarrow Li_2S_2 \rightarrow Li_2S$ or the like, and among them, $Li_2S_8$ and $Li_2S_4$ (lithium polysulfide), which are long chains of sulfur, are easily dissolved in a general electrolyte used in a lithium ion battery. When this reaction occurs, not only the reversible positive electrode capacity is greatly reduced but also the dissolved lithium polysulfide diffuses into the negative electrode and causes various side reactions.

The lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as functional liquid electrolytes, polymer electrolytes, and ionic liquids, which have a novel composition, and thus inhibiting the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$, or $Li_xSO_y$ on the surface of a lithium negative electrode, and a method of forming a thick functional SEI layer on the surface of lithium metal, or the like.

Finally, as a method of improving the properties of the positive electrode, there is a method of forming a coating layer on the surface of the positive electrode particles to prevent the dissolution of the polysulfide, adding a porous material capable of capturing the dissolved polysulfide or so on. Typically, a method of coating the surface of a positive electrode structure containing a sulfur particle with a conductive polymer, a method of coating the surface of a positive electrode structure with a metal oxide on which lithium ions are transferred, a method of adding a porous metal oxide having a large specific surface area and a large pore size to a positive electrode, which is capable of absorbing a large amount of lithium polysulfide, a method of attaching a functional group capable of adsorbing lithium polysulfide onto the surface of a carbon structure, a method of wrapping sulfur particles using graphene or graphene oxide, or the like was proposed.

Although such efforts are under way, these methods are not only complicated, but also have a problem that the amount of sulfur that can be added, which is an active material, is limited. Therefore, it is necessary to develop new technologies to solve these problems and to improve the performance of lithium-sulfur battery.

DISCLOSURE

Technical Problem

In order to solve the above problems, as a result of various studies on the positive electrode additive of a lithium secondary battery, the inventors of the present invention have confirmed that iron sulfide can be prepared with selective and high purity by mixing and heat-treating an iron precursor and a sulfur precursor while controlling the heat treatment temperature and process time.

Accordingly, it is an object of the present invention to provide a method for preparing iron sulfide through a simple process, which is a positive electrode additive of a high purity lithium secondary battery.

In addition, in order to solve the problem of leaching of lithium polysulfide occurring on the positive electrode side of the lithium secondary battery and to suppress side reactions with the electrolyte, as a result of introducing iron sulfide ($FeS_2$) prepared by the above method to the positive electrode of the lithium secondary battery, the inventors of the present invention have confirmed that the battery performance of the lithium secondary battery can be improved by introducing iron sulfide ($FeS_2$) prepared by the above method into the positive electrode of the lithium secondary battery, thereby resolving the above problems, and thus have completed the present invention.

Accordingly, it is another object of the present invention to provide a positive electrode additive for a lithium secondary battery, which can solve the problems caused by lithium polysulfide.

In addition, it is still another object of the present invention to provide a lithium secondary battery having the positive electrode and thus having improved lifetime characteristics of the battery.

Technical Solution

In order to achieve the above objects, the present invention provides a method for preparing iron sulfide ($FeS_2$) comprising the steps of: (1) mixing an iron precursor and a sulfur precursor to form a mixture; and (2) heat-treating the mixture in an inert gas atmosphere.

In addition, the present invention provides a positive electrode for a lithium secondary battery comprising an active material, an electrically conductive material, and a binder, wherein the positive electrode comprises iron sulfide ($FeS_2$).

The present invention also provides a lithium secondary battery comprising the positive electrode as described above for the lithium secondary battery, a negative electrode, a separator interposed between the positive electrode and the negative electrode, and an electrolyte.

Advantageous Effects

According to the present invention, there is an advantage that iron sulfide can be prepared with selective and high purity by a simple process comprising steps of mixing an iron precursor and a sulfur precursor and heat-treating them.

In addition, if the iron sulfide ($FeS_2$) prepared above is applied to the positive electrode of the lithium secondary battery, the reactivity of the positive electrode for the lithium secondary battery is increased by adsorbing lithium polysulfide generated during charging and discharging of the lithium secondary battery and the side reactions with the electrolyte are suppressed.

In addition, the lithium secondary battery having the positive electrode containing iron sulfide ($FeS_2$) described above does not cause a reduction in the capacity of sulfur, which makes it possible to implement the battery with high capacity, and not only is capable of stably applying sulfur with high loading, but also improving over-voltage of the battery because there are no problems such as short-circuiting or heat generation in the battery, thereby improving the stability of the battery. In addition, such a lithium secondary battery has an advantage that the charging and discharging efficiency of the battery is high and the lifetime characteristic is improved.

DESCRIPTION OF DRAWINGS

FIG. 1 shows a scanning electron microscope (SEM) image for iron sulfide ($FeS_2$) according to Preparation Example 1 of the present invention.

FIG. 2 shows a scanning electron microscope (SEM) image for iron sulfide ($FeS_2$) according to Preparation Example 2 of the present invention.

FIG. 3 shows the results of X-ray diffraction analysis (XRD) for iron sulfide ($FeS_2$) according to Preparation Example 1 of the present invention.

FIG. 4 shows the results of X-ray diffraction analysis (XRD) for iron sulfide ($FeS_2$) according to Preparation Example 2 of the present invention.

FIG. 5 shows the results of the comparison of X-ray diffraction analysis (XRD) for iron sulfide ($FeS_2$) according to Preparation Example 1 of the present invention and Comparative Preparation Example 1.

FIG. 6 shows the results of X-ray diffraction analysis (XRD) for the product ($NH_4Fe(SO_4)_2$) according to Comparative Preparation Example 2 of the present invention.

FIG. 7 shows the results of the comparison of the X-ray diffraction analysis (XRD) for the product according to Comparative Preparation Example 3 of the present invention.

FIGS. 8 and 9 show the measurement results of the discharging capacity of lithium secondary batteries prepared according to examples of the present invention and comparative examples.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium secondary battery is manufactured by using a material capable of intercalating/deintercalating lithium ions as a negative electrode and a positive electrode, and filling an organic electrolyte solution or a polymer electrolyte solution between a negative electrode and a positive electrode, and means an electrochemical device that generates electrical energy by the oxidation/reduction reaction when lithium ions are intercalated and deintercalated at positive and negative electrodes. According to an embodiment of the present invention, the lithium secondary battery may be a lithium-sulfur battery comprising 'sulfur' as an electrode active material of a positive electrode.

The present invention relates to a method for preparing iron sulfide ($FeS_2$), and more particularly, to a method for preparing iron sulfide which has a form and physical properties that can be applied as a positive electrode additive for a lithium secondary battery to improve the discharging capacity and lifetime characteristics of the battery.

In addition, the present invention provides a positive electrode for a lithium secondary battery, which improves the problem of continuous degradation of the reactivity of the electrode and the problem of reduced discharging capacity due to the dissolution and the shuttle phenomenon of the lithium polysulfide by complementing the disadvantages of the conventional positive electrode for the lithium secondary battery. Specifically, the positive electrode for a lithium sulfur battery provided by the present invention is characterized by comprising an active material, an electrically conductive material, and a binder, and also comprising iron sulfide ($FeS_2$) as a positive electrode additive.

In particular, the iron sulfide ($FeS_2$) described above is comprised in the positive electrode for a lithium secondary battery in the present invention, to adsorb lithium polysulfide, and thus can reduce the problem that the lithium polysulfide is delivered to the negative electrode to reduce the lifetime of the lithium secondary battery and can suppress the reduced reactivity due to lithium polysulfide, thereby increasing the discharging capacity of the lithium secondary battery comprising the above positive electrode and improving the lifetime of the battery.

Preparation Method of Iron Sulfide

The method for preparing iron sulfide ($FeS_2$) according to the present invention comprises the steps of (1) mixing an iron precursor and a sulfur precursor to form a mixture and (2) heat-treating the mixture in an inert gas atmosphere.

The iron precursor according to the present invention refers to a substance capable of reacting with a sulfur precursor to form iron sulfide ($FeS_2$). Examples of preferred iron precursors may be iron nitrate represented by $Fe(NO_3)_3 \cdot 9H_2O$, iron hydroxide represented by $\gamma$-FeOOH, or a combination thereof. However, considering the fact that the performance of the battery is changed by the structural difference of the prepared iron sulfide (see the comparative experiment of the discharging capacity in the following examples), it is more preferable to apply iron hydroxide ($\gamma$-FeOOH, or Lepidocrocite) rather than iron nitrate ($Fe(NO_3)_3 \cdot 9H_2O$) as the iron precursor.

The sulfur precursors comprise thiourea ($CH_4N_2S$), ammonium thiosulfate (($NH_4)_2S_2O_3$), and sulfur (S). However, in the case of ammonium thiosulfate, a side reaction in which $NH_4Fe(SO_4)_2$, etc. are produced instead of complete sulfurization may occur according to the preparation method according to the present invention. Also, if sulfur (S) itself is used as a sulfur precursor, even when the reaction is carried out with a molar ratio of iron (Fe) and sulfur (S) of 1:8 or more as described later, homogeneous iron sulfide ($FeS_2$) may not be produced, for example, $Fe_7S_8$ and $FeS_2$ are produced together and so on. Therefore, in order to prepare iron sulfide ($FeS_2$) according to the present invention, it is preferable to use thiourea ($CH_4N_2S$) having a relatively high boiling point. Meanwhile, in the case of $Fe_7S_8$ which is a product of the above-described side reactions, there is also a problem that it may react with the binder in the positive electrode for the lithium secondary battery, thereby worsening the performance of the battery.

Mixing of the iron precursor and the sulfur precursor may be performed by a method known to those skilled in the art. The mixing ratio of the iron precursor and the sulfur precursor may be a ratio such that the molar ratio of iron (Fe) and sulfur (S) comprised in the iron precursor and the sulfur precursor is 1:8 or more, preferably 1:10 or more. If the molar ratio of sulfur is less than the above range, a side reaction in which $Fe_7S_8$ and the like are generated due to the insufficient content of sulfur through a heat treatment process described below may occur, which may cause the above-described side reaction with the binder. Therefore, it is preferable to maintain the mixing ratio of sulfur above the ranges described above.

Next, the present invention comprises the step of heat-treating the mixture of step (1) in an inert gas atmosphere. The iron precursor and the sulfur precursor react through the heat treatment process described above to produce iron sulfide ($FeS_2$). The heat treatment may be carried out at 400 to 600° C., and preferably at 400 to 500° C. In one embodiment according to the invention, the temperature increase rate of the heat treatment can be adjusted in the range of 5 to 20° C. per minute. If the temperature increase rate exceeds 20° C./min, the decomposition rate of the sulfur precursor, which is a reactant material, may be excessively high, thereby reducing the amount of sulfur reacting with the iron precursor, and as a result, there is a problem that iron sulfide can be produced in the form of $Fe_7S_8$ rather than the desired iron sulfide ($FeS_2$). In addition, when the temperature increase rate is less than 5° C./min, there may be a problem that the production time of the desired product may be too long. Therefore, the temperature increase rate is suitably adjusted in the said range.

In addition, the heat treatment may be performed for 1 to 3 hours in the above temperature range, and preferably for 1 to 2 hours. If the heat treatment temperature is less than 400° C. or the heat treatment time is shorter than the heat treatment time described above, the iron precursor and the sulfur precursor may not sufficiently react to produce the desired iron sulfide ($FeS_2$). In addition, if the heat treatment temperature exceeds 600° C. or the heat treatment time is longer than the heat treatment time described above, the iron sulfide ($FeS_2$) particles produced may be larger in size or, unlike the desired iron sulfide ($FeS_2$), unnecessary oxides may be produced. Therefore, since it may be difficult to synthesize the iron sulfide ($FeS_2$) having the desired physical properties according to the present invention, the temperature and time in the heat treatment are appropriately adjusted within the temperature and time period in the ranges described above.

The heat treatment of step (2) may be performed in an inert gas atmosphere. The inert gas atmosphere may be (i) under an inert gas atmosphere in which the gas inside the reactor is replaced with an inert gas, or (ii) a state in which the inert gas is continuously introduced to continuously replace the gas in the reactor. In the case of (ii), for example, the flow rate of the inert gas may be 1 to 500 mL/min, specifically 10 to 200 mL/min, more specifically 50 to 100 mL/min.

Here, the inert gas may be selected from the group consisting of nitrogen, argon, helium, and mixtures thereof, and preferably nitrogen may be used.

The iron sulfide ($FeS_2$) according to an embodiment of the present invention is crystalline, and as a result of X-ray diffraction analysis using CuKα rays, the XRD peaks of (111), (200), (210), (211), (220), (311), (222) and (321) planes were seen at $2\theta=28.4\pm0.2°$, $32.9\pm0.2°$, $36.9\pm0.2°$, $40.6\pm0.2°$, $47.3\pm0.2°$, $56.0\pm0.2°$, $58.9\pm0.2°$, $61.5\pm0.2°$, and $64.0\pm0.2°$, respectively. Through this, it can be confirmed that iron sulfide ($FeS_2$) according to the present invention was synthesized.

The iron sulfide ($FeS_2$) prepared by the above preparation method may be crystalline with an average particle diameter of several hundred nm to several μm, for example, 0.1 to 10 μm. If the average particle diameter exceeds 10 μm, it may not match well with other electrode materials of lithium secondary battery, and when adding the same amount, the performance improvement effect of the battery may be insignificant compared to iron sulfide ($FeS_2$) which has a relatively small average particle diameter. On the other hand, if iron hydroxide (γ-FeOOH) is applied as the iron precursor, iron sulfide ($FeS_2$) comprising plate-shaped particles having an average particle diameter of several hundred nm to several μm can be prepared. In this case, as described above, there is an advantage that the battery performance is better due to the structural difference of the iron sulfide (see the comparative experiment of discharging capacity in the examples below).

The iron sulfide ($FeS_2$) prepared by the above preparation method can effectively adsorb the lithium polysulfide leached during charging and discharging of the lithium secondary battery, thereby being suitable as a positive electrode material for a lithium secondary battery, and does not cause side reactions with the binder in the positive electrode of the battery, thereby improving the performance of the battery.

Positive Electrode for Lithium Secondary Battery

The present invention provides a positive electrode for a lithium secondary battery comprising an active material, an electrically conductive material, and a binder, wherein the positive electrode comprises iron sulfide ($FeS_2$) prepared through the above preparation method.

At this time, the positive electrode for the lithium secondary battery may comprise a current collector and an electrode active material layer formed on at least one side of the current collector, and the electrode active material layer may comprise base solids containing an active material, an electrically conductive material, and a binder. As the current collector, it is preferable to use aluminum, nickel or the like having excellent conductivity.

In one embodiment, iron sulfide ($FeS_2$) as described above may be contained in an amount of 0.1 to 15 parts by weight, specifically, 1 to 15 parts by weight, preferably 5 to 10 parts by weight based on 100 parts by weight of the base solids containing the active material, the electrically conductive material, and the binder. If the content is less than the lower limit value of the above-mentioned numerical range, the adsorption effect for the polysulfide may be insignificant. If the content exceeds the upper limit value, the capacity of the electrode can be reduced, which are not preferable. As the iron sulfide ($FeS_2$), the iron sulfide ($FeS_2$) prepared by preparation method presented by the present invention can be used.

Meanwhile, the active material in the base solids constituting the positive electrode of the present invention may comprise elemental sulfur ($S_8$), a sulfur-based compound, or a mixture thereof. Specifically, the sulfur-based compound may be $Li_2S_n(n\geq1)$, an organic sulfur compound, or a carbon-sulfur composite (($C_2S_x)_n$: x=2.5~50, n≥2).

The positive electrode for a lithium secondary battery according to the present invention may preferably include an active material of a sulfur-carbon composite. Since the sulfur material alone is not electrically conductive, it can be used in combination with an electrically conductive material. The addition of iron sulfide ($FeS_2$) according to the present invention does not affect the structure maintenance of this sulfur-carbon composite.

In one embodiment, the carbon-sulfur composite may contain 60 to 90 parts by weight of sulfur, preferably 70 to 75 parts by weight of sulfur, based on 100 parts by weight of the carbon-sulfur composite. If the content of sulfur is less than 60 parts by weight, the content of the carbon material in the carbon-sulfur composite is relatively increased. As the content of the carbon is increased, the specific surface area is increased and thus when preparing the slurry, the amount of binder added should be increased. Such an increase in the additive amount of the binder may eventually increase the sheet resistance of the electrode, and may act as an insulator to prevent electron pass, thereby deteriorating the battery performance. If the content of sulfur exceeds 90 parts by weight, the sulfur or sulfur compounds not bound to the carbon material may be aggregated with each other or re-leached on the surface of the carbon material, and it may be difficult to directly participate in the electrode reaction because it is difficult to receive electrons. Therefore, the amount of sulfur contained is appropriately controlled within the above range.

The carbon in the carbon-sulfur composite according to the present invention has a porous structure or a high specific surface area, and thus any carbon material conventionally used in the art may be used. For example, the porous carbon material may be, but is not limited to, at least one selected from the group consisting of graphite; graphene; carbon black such as Denka black, acetylene black, Ketjen black, channel black, furnace black, lamp black, and thermal black; carbon nanotube (CNT) such as single-wall carbon nanotube (SWCNT) and multi-wall carbon nanotube (MWCNT); carbon fibers such as graphite nanofiber (GNF), carbon nanofiber (CNF), and activated carbon fiber (ACF); and activated carbon. Also, the porous carbon material may be in the form of spherical, rod-shaped, acicular, plate-shaped, tubular, or bulky, and may be used without limitation as long as it is commonly used in lithium secondary batteries.

The active material may be preferably used in an amount of 50 to 95 parts by weight, more preferably about 70 parts by weight, based on 100 parts by weight of the base solids. If the active material is comprised in an amount less than the above range, the reaction of the electrode is difficult to be sufficiently exerted. Even if the active material is comprised in an amount more than the above range, the content of other conductive materials and binders is relatively insufficient and it is difficult to exhibit sufficient electrode reaction. Therefore, it is preferable to determine an appropriate content within the above range.

Among the base solids constituting the positive electrode of the present invention, the electrically conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite-based materials such as KS6; carbon blacks such as Super P, carbon black, Denka black, acetylene black, Ketjen black, channel black, furnace black, lamp black, and thermal black; carbon derivatives such as fullerene; conductive fibers such as carbon fiber and metal fiber; carbon fluoride; metal powders such as aluminum and nickel powder; or conductive polymers such as polyaniline, polythiofene, polyacetylene, and polypyrrole can be used alone or in combination.

The electrically conductive material may be preferably used in an amount of 1 to 10 parts by weight, preferably about 5 parts by weight, based on 100 parts by weight of base solids. If the content of the electrically conductive material contained in the electrode is less than the above range, the unreacted portion of the sulfur in the electrode is increased and eventually the capacity is reduced. If the content exceeds the above range, the high efficiency discharging characteristic and the charging/discharging cycle lifetime are adversely affected. Therefore, it is desirable to determine the appropriate content within the above-mentioned range.

The binder as the base solids is a material that is comprised to cause a slurry composition of the base solids that forms a positive electrode to adhere well to the current collector, and that is well dissolved in a solvent and can well constitute a conductive network between a positive electrode active material and a conductive material. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVdF), polyhexafluoropropylene, copolymer (product name: Kynar) of polyvinylidene fluoride, poly(ethyl acrylate), polyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber, and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, preferably about 5 parts by weight, based on 100 parts by weight of the base composition contained in the electrode. If the content of the binder resin is less than the above range, the physical properties of the positive electrode are degraded, and thus the positive electrode active material and the electrically conductive material can be dropped off. If the content of the binder resin exceeds the above range, the ratio of the active material and the conductive material in the positive electrode may be relatively decreased, thereby reducing the battery capacity. Therefore, it is preferable that the content of the binder resin is appropriately determined within the above-mentioned range.

As described above, the positive electrode comprising iron sulfide ($FeS_2$) and base solids can be prepared by conventional methods. For example, to a positive electrode active material, a solvent, and if necessary, a binder, a conductive material, and a dispersant were mixed and stirred to prepare a slurry. Then, the prepared slurry can be applied (coated) on a current collector of a metal material, compressed and then dried to produce a positive electrode.

For example, in preparing the positive electrode slurry, first, after iron sulfide ($FeS_2$) is dispersed in a solvent, the obtained solution is mixed with the active material, the electrically conductive material, and the binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode. There are no limitations on the method of coating the slurry. For example, it is possible to use a coating method such as doctor blade coating, dip coating, gravure coating, slit die coating, spin coating, comma coating, bar coating, reverse roll coating, screen coating, cap coating and the like.

At this time, a solvent capable of not only uniformly dispersing a positive electrode active material, a binder, and a conductive material, but also easily resolving iron sulfide ($FeS_2$) can be used as the solvent. As such a solvent, water is most preferable as an aqueous solvent. At this time, water may be a secondary distilled water (DW) or a tertiary distilled water (DIW: deionized water), but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

In one embodiment, the positive electrode comprises a current collector and an electrode active material layer formed on at least one side of the current collector, the electrode active material layer comprises an active material, an electrically conductive material, a binder and iron sulfide ($FeS_2$) according to the present invention, and the porosity of the electrode active material layer may be 60 to 75%, specifically 60 to 70%, preferably 60 to 65%.

In the present invention, the term "porosity" means the ratio of the volume occupied by the pores to the total volume in a structure, and its unit is %.

In the present invention, the measurement of the porosity is not particularly limited. For example, according to one embodiment of the present invention, the micro and meso pore volume can be measured by, for example, a Brunauer-Emmett-Teller (BET) measurement method or a Hg porosimeter.

If the porosity of the electrode active material layer is less than 60%, the degree of filling of the base solid comprising the active material, the electrically conductive material, and the binder becomes excessively high, so that a sufficient electrolyte solution capable of exhibiting ion conduction and/or electric conduction cannot be maintained between the active materials, and thus the output characteristics and the cycle characteristics of the battery may be deteriorated, and also the overvoltage of the battery is severe and the discharging capacity is greatly reduced, and thus, there is a problem that the effect generated by comprising iron sulfide ($FeS_2$) according to the present invention may not be properly manifested. If the porosity exceeds 75% and thus is too high, there are problems that the physical and electrical connection with the current collector is lowered and the adhesive force is lowered and the reaction becomes difficult and that the energy density of the battery may be lowered because the pores due to the increased porosity are filled with the electrolyte solution. Therefore, the porosity is appropriately controlled within the above range. According to an embodiment of the present invention, the porosity may be performed by a method selected from the group consisting of a hot press method, a roll press method, a plate press method, and a roll laminate method.

In one embodiment of the present invention, the positive electrode may have a loading amount of sulfur per unit area of 3 to 7 $mAh/cm^2$, preferably 4 to 6 $mAh/cm^2$. In general, if the loading amount is 6 $mAh/cm^2$ or more, the overvoltage of the battery is generated and the discharging capacity is reduced. However, since the present invention includes the iron sulfide ($FeS_2$) in the positive electrode, there is an effect that even in the high loading amount of 4 to 6 $mAh/cm^2$, the overvoltage is improved and the discharging capacity of the battery is improved.

Lithium Secondary Battery

Meanwhile, the present invention provides a lithium secondary battery comprising a positive electrode for a lithium secondary battery, a negative electrode, a separator interposed between the positive electrode and the negative electrode, and an electrolyte.

At this time, the negative electrode, separator, and electrolyte may be made of conventional materials that can be used in a lithium secondary battery.

Specifically, the negative electrode may comprise a material capable of reversibly intercalating or deintercalating lithium ion (Lit), a material capable of reacting with lithium ion to reversibly form a lithium-containing compound, lithium metal, or a lithium alloy as an active material.

The material capable of reversibly intercalating or deintercalating lithium ion (Lit) may be, for example, crystalline carbon, amorphous carbon, or mixtures thereof. In addition, the material capable of reacting with lithium ion (Lit) to reversibly form the lithium-containing compound may be, for example, tin oxide, titanium nitrate, or silicon. In addition, the lithium alloy may be, for example, an alloy of lithium and the metal selected from the group consisting of Na, K, Rb, Cs, Fr, Be, Mg, Ca, Sr, Ba, Ra, Al, and Sn.

In addition, the negative electrode may further optionally comprise a binder together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be specifically selected from the group consisting of copper, aluminum, stainless steel, titanium, silver, palladium, nickel, alloys thereof, and combinations thereof. The stainless steel may be surface-treated with carbon, nickel, titanium, or silver, and an aluminum-cadmium alloy may be used as the alloy. In addition, sintered carbon, a nonconductive polymer surface-treated with an electrically conductive material, or a conductive polymer may be used.

In addition, the negative electrode may be a thin film of lithium metal.

As the separator, a material capable of separating or insulating the positive electrode and the negative electrode from each other while allowing the lithium ion to be transported therebetween is used. The material can be used as a separator without any particular limitations as long as it is used as a separator in the lithium secondary battery. Particularly, it is desirable to use a separator having excellent wettability to the electrolyte while having low resistance to ion migration of the electrolyte.

More preferably, as the material for the separator, a porous, nonconductive or insulating material can be used, and for example, the separator may be an independent member such as a film, or may comprise a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

The electrolyte is a non-aqueous electrolyte containing lithium salt and is composed of lithium salt and an electrolyte solution, and as the electrolyte solution, non-aqueous organic solvent, organic solid electrolyte, and inorganic solid electrolyte are used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$. LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LIN(CF$_3$SO$_2$)$_2$, lithium chloroborane, lithium lower aliphatic carboxylate and lithium imide.

The concentration of the lithium salt may be 0.2 to 2 M, preferably 0.6 to 2 M, more preferably 0.7 to 1.7 M depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than the above range, the conductivity of the electrolyte may be lowered and thus the performance of the electrolyte may be deteriorated. If the concentration of the lithium salt exceeds the above range, the viscosity of the electrolyte may increase and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol diacetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly alginate lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be preferably used.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention constituted as described above comprises iron sulfide (FeS$_2$) to adsorb the lithium polysulfide generated during charging and discharging of the lithium secondary battery, thereby increasing the reactivity of the positive electrode of the lithium secondary battery, and increasing the discharging capacity and lifetime of the lithium secondary battery. In addition, in the case of containing iron sulfide (FeS$_2$) according to the present invention, there is an advantage that the overvoltage is improved and the discharging capacity is improved even in the electrode of high loading and low porosity.

Hereinafter, the present invention will be described in more detail with reference to Examples and the like. However, the scope and content of the present invention cannot be construed as narrowing down or limiting the invention by Examples and the like. Also, it will be apparent on the basis of the disclosures of the present invention comprising the following Examples that the present invention, in which experimental results are not specifically shown, can be easily carried out by those skilled in the art and that such modifications and variations are intended to fall within the scope of the appended claims.

Preparation Example 1: Preparation of Iron Sulfide 1.9 g of iron nitrate hydrate (Fe(NO$_3$)$_3$.9H$_2$O) (Sigma-Aldrich company) as an iron precursor and 3.6 g of thiourea (CH$_4$N$_2$S) (Sigma-Aldrich company) as a precursor of sulfur were mixed (Fe:S=1:10 molar ratio).

The mixture was heat-treated at 400° C. for 1.5 hours while flowing argon gas at a flow rate of 100 mL/min. At this time, the temperature increase rate for heat treatment was 10° C. per minute. An iron sulfide (FeS$_2$) was prepared through the heat treatment.

Preparation Example 2: Preparation of Iron Sulfide

An iron sulfide (FeS$_2$) having plate-like particles was prepared in the same manner as in Preparation Example 1, except that 0.42 g of iron hydroxide (γ-FeOOH) is used instead of iron nitrate hydrate (Fe(NO$_3$)$_3$.9H$_2$O) as an iron precursor.

Comparative Preparation Example 1: Preparation of Iron Sulfide

It was carried out in the same manner as in Preparation Example 1 except that the molar ratio of iron (Fe) to sulfur(S) is 1:4.

Comparative Preparation Example 2: Preparation of Iron Sulfide

It was carried out in the same manner as in Preparation Example 1 except that 1.4 g of ammonium thiosulfate ((NH$_4$)$_2$S$_2$O$_3$) is used instead of thiourea (CH$_4$N$_2$S) as a sulfur precursor.

Comparative Preparation Example 3: Preparation of Iron Sulfide

It was carried out in the same manner as in Preparation Example 1 except that 1.5 g of sulfur(S) is used instead of thiourea (CH$_4$N$_2$S) as a sulfur precursor.

Experimental Example 1: Scanning Electron Microscope (SEM) Analysis

The iron sulfide ($FeS_2$) prepared in Preparation Examples 1 and 2 was subjected to SEM analysis (S-4800 FE-SEM from Hitachi company), and the results are shown in FIGS. 1 and 2. Preparation Example 1 is shown in FIG. 1, and Preparation Example 2 is shown in FIG. 2, respectively.

Referring to FIGS. 1 and 2, as a result of SEM analysis of Preparation Example 1 with a magnification of 20 k, it was confirmed that amorphous iron sulfide ($FeS_2$) particles having a particle diameter of several μm were formed. Also, as a result of SEM analysis of Preparation Example 2, it was confirmed that plate-shaped iron sulfide ($FeS_2$) particles having a particle diameter of several hundred nm to several μm were formed.

Experimental Example 2: X-Ray Diffraction (XRD) Analysis

The iron sulfide ($FeS_2$) prepared in Preparation Examples 1 and 2 was subjected to XRD analysis (D4 Endeavor from Bruker company). FIG. 3 is a graph showing the results of X-ray diffraction analysis (XRD) for iron sulfide ($FeS_2$) according to Preparation Example 1 of the present invention, and FIG. 4 is a graph showing the results of X-ray diffraction analysis (XRD) for iron sulfide ($FeS_2$) according to Preparation Example 2 of the present invention.

Referring to FIGS. 3 and 4, as a result of X-ray diffraction analysis using CuKα rays, the XRD peaks of (111), (200), (210), (211), (220), (311), (222) and (321) planes were seen at $2\theta = 28.4\pm0.2°$, $32.9\pm0.2°$, $36.9\pm0.2°$, $40.6\pm0.2°$, $47.3\pm0.2°$, $56.0\pm0.2°$, $58.9\pm0.2°$, $61.5\pm0.2°$, and $64.0\pm0.2°$, respectively, and thus it was confirmed that iron nitrate hydrate ($Fe(NO_3)_3 \cdot 9H_2O$) and iron hydroxide (γ-FeOOH), which are the iron precursors of Preparation Examples 1 and 2, respectively, reacted with excess sulfur to form crystalline iron sulfide ($FeS_2$) in pure phase, and given that no XRD peaks of sulfur were observed, it was confirmed that excess sulfur was all removed during the temperature rising process of the heat treatment.

Meanwhile, the results of XRD analysis on the products according to Comparative Preparation Examples 1 to 3 are shown in FIGS. 5 to 7, respectively.

Referring to FIG. 5, in Comparative Preparation Example 1 in which the molar ratio of iron (Fe) to sulfur (S) was 1:4, the peaks of $Fe_7S_8$ were confirmed instead of the iron sulfide ($FeS_2$) desired in the present invention. When the molar ratio of iron (Fe) to sulfur (S) is 1:10 or more, it was confirmed that the single-phase iron sulfide ($FeS_2$) according to the present invention was synthesized. Therefore, it was confirmed that the molar ratio of iron (Fe) to sulfur (S) was found to affect the composition of the final product produced.

Referring to FIG. 6, when using ammonium thiosulfate (($NH_4)_2S_2O_3$) as a sulfur precursor, it was confirmed that side reactions occurred and thus peaks of $NR_4Fe(SO_4)_2$ were appeared instead of iron sulfide ($FeS_2$).

Referring to FIG. 7, when using sulfur (S) itself as a sulfur precursor, it was confirmed that even when the molar ratio of iron (Fe) to sulfur (S) is 1:10, $Fe_7S_8$ is produced together instead of $FeS_2$ in a single phase. When the molar ratio of iron (Fe) to sulfur (S) is less than 1:2, it was confirmed that the $FeS_2$ desired in the present invention was not produced, and also it was confirmed that as a result of the insufficient ratio of sulfur, $Fe_7S_8$ and iron oxide ($Fe_3O_4$) are present in a mixed state.

Example 1: Preparation of Lithium Secondary Battery Including Positive Electrode to Which Iron Sulfide was Added 5 parts by weight of iron sulfide ($FeS_2$) prepared in Preparation Example 1, relative to the total weight (100 parts by weight) of the base solids (active material, electrically conductive material, and binder) to which iron sulfide ($FeS_2$) is to be added, was added to water as a solvent and dissolved. Subsequently, with respect to the obtained solution, a total of 100 parts by weight of the base solids, that is, 90 parts by weight of sulfur-carbon composite (S/CNT 75:25 weight ratio) as the active material, 5 parts by weight of Denka black as the electrically conductive material, and 5 parts by weight of styrene butadiene rubber/carboxymethyl cellulose (SBR/CMC 7:3) as a binder was added and mixed to prepare a positive electrode slurry composition.

Subsequently, the prepared slurry composition was coated on a current collector (Al Foil), dried at 50° C. for 12 hours, and pressed with a roll press to prepare a positive electrode. In this case, the loading amount was 5.3 mAh/cm², and the porosity of the electrode was 68%.

Thereafter, a coin cell of a lithium secondary battery comprising the positive electrode prepared as described above, a negative electrode, a separator, and an electrolyte was manufactured as follows. Specifically, the positive electrode was punched out and used as a 14 phi circular electrode, polyethylene (PE) separator was punched out and used as a 19 phi separator, 150 um lithium metal was punched out and used as a 16 phi negative electrode.

Example 2: Preparation of Lithium Secondary Battery Including Positive Electrode to Which Iron Sulfide was Added A lithium secondary battery was prepared in the same manner as in Example 1 (i.e., the porosity of the electrode was 68%), except that the iron sulfide ($FeS_2$) having plate-shaped particles prepared in Preparation Example 2 was used instead of the iron sulfide ($FeS_2$) prepared in Preparation Example 1.

Example 3: Preparation of Lithium Secondary Battery Including Positive Electrode to Which Iron Sulfide was Added A lithium secondary battery was prepared in the same manner as in Example 2, except that the electrode containing the iron sulfide (FeS2) having the plate-shaped particles prepared in Preparation Example 2 was rolled to change the porosity of the electrode from 68% to 62%.

Comparative Example 1: Preparation of Lithium Secondary Battery Including Positive Electrode to Which Iron Sulfide was not Added A total of 100 parts by weight of the base solids, that is, 90 parts by weight of sulfur-carbon composite (S/CNT 75:25 weight ratio) as the active material, 5 parts by weight of Denka black as the electrically conductive material, and 5 parts by weight of styrene butadiene rubber/carboxymethyl cellulose (SBR/CMC 7:3) as a binder was added to water as a solvent, which does not comprise iron sulfide (FeS$_2$), and mixed to prepare a positive electrode slurry composition.

Subsequently, the prepared slurry composition was coated on a current collector (Al Foil), dried at 50° C. for 12 hours to prepare a positive electrode. In this case, the loading amount was 5.3 mAh/cm$^2$, and the porosity of the electrode was 68%.

Thereafter, a coin cell of a lithium secondary battery comprising the positive electrode prepared as described above, a negative electrode, a separator, and an electrolyte solution was manufactured as follows. Specifically, the positive electrode was punched out and used as a 14 phi circular electrode, polyethylene (PE) separator was punched out and used as a 19 phi separator, 150 um lithium metal was punched out and used as a 16 phi negative electrode.

Comparative Example 2: Preparation of Lithium Secondary Battery Including Positive Electrode to Which Iron Sulfide was not Added A lithium secondary battery was prepared in the same manner as in Comparative Example 2, except that the electrode was rolled to change the porosity of the electrode from 68% to 62%.

Experimental Example 3: Comparative Experiment of Discharging Capacity of Lithium Secondary Battery In order to test the discharging capacity of the lithium secondary battery depending on the type of positive electrode material, the discharging capacity of the lithium secondary batteries prepared in Examples 1 to 3, Comparative Examples 1 and 2 were measured as shown in Table 1. At this time, the measurement current was 0.1 C, the voltage range was 1.8 to 2.6V, and the results are shown in FIGS. 8 and 9.

FIGS. 8 and 9 are graphs showing the measurement results of the discharging capacity of lithium secondary batteries prepared according to an example of the present invention and a comparative example. As shown in FIG. 8, it was confirmed that Example 1, in which iron sulfide (FeS$_2$) prepared in Preparation Example 1 was added to the positive electrode, and Example 2, in which iron sulfide (FeS$_2$) prepared in Preparation Example 2 was added to the positive electrode, improve the overvoltage of the battery and increase the initial discharging capacity further than the conventional Comparative Example 1. Therefore, it was found that the iron sulfide according to the present invention has an effect of increase in the initial discharging capacity and overvoltage improvement of the lithium secondary battery.

In particular, as shown in FIG. 8, it was confirmed that the initial discharging capacity of Example 2 using iron hydroxide (γ-FeOOH) as the iron precursor of the iron sulfide was superior to Example 1 using iron nitrate hydrate (Fe(NO$_3$)$_3$.9H$_2$O) as the iron precursor of the iron sulfide. In Experimental Example 2 for XRD analysis, from the fact that even though the iron sulfide with iron hydroxide and the iron sulfide with iron nitrate hydrate have the same crystal structure, these show different battery performance, it can be seen that the structural differences of iron sulfide play an additional important role in improving the cell performance.

Therefore, as described above, it was confirmed that the iron sulfide (FeS$_2$) was added to the positive electrode, but it is more preferable to use iron sulfide (FeS$_2$) prepared by using iron hydroxide (γ-FeOOH) as an iron precursor rather than iron nitrate hydrate (Fe(NO$_3$)$_3$.9H$_2$O).

Meanwhile, in the case of a general lithium secondary battery, when the porosity of electrode is lowered, the performance of the battery is reduced due to the decrease of the electrolyte contained in the electrode. However, as shown in FIG. 9, it was confirmed that even when the porosity of electrode was lowered, the initial discharging capacity of the electrode was increased and the overvoltage was improved (comparative contrast between Example 3 and Comparative Example 2). Therefore, it was found that iron sulfide (FeS$_2$) according to the present invention has an

TABLE 1

| | Lithium secondary battery | |
|---|---|---|
| | Negative electrode | Positive electrode |
| Example 1 | Metal lithium | Sulfur-carbon composite (S:CNT = 75:25) + electrically conductive material + binder + FeS$_2$ (5 parts by weight) (90:5:5:5, weight ratio) of Preparation Example 1<br>Sulfur loading amount in positive electrode: 5.3 mAh/cm$^2$<br>Porosity of electrode: 68% |
| Example 2 | Metal lithium | Sulfur-carbon composite (S:CNT = 75:25) + electrically conductive material + binder + FeS$_2$ (5 parts by weight) (90:5:5:5, weight ratio) of Preparation Example 2<br>Sulfur loading amount in positive electrode: 5.3 mAh/cm$^2$<br>Porosity of electrode: 68% |
| Example 3 | Metal lithium | Sulfur-carbon composite (S:CNT = 75:25) + electrically conductive material + binder + FeS$_2$ (5 parts by weight) (90:5:5:5, weight ratio) of Preparation Example 2<br>Sulfur loading amount in positive electrode: 5.3 mAh/cm$^2$<br>Porosity of electrode: 62% |
| Comparative Example 1 | Metal lithium | Sulfur-carbon composite (S:CNT = 75:25) + electrically conductive material + binder (90:5:5, weight ratio)<br>Sulfur loading amount in positive electrode: 5.3 mAh/cm$^2$<br>Porosity of electrode: 68% |
| Comparative Example 2 | Metal lithium | Sulfur-carbon composite(S:CNT = 75:25) + electrically conductive material + binder (90:5:5, weight ratio)<br>Sulfur loading amount in positive electrode: 5.3 mAh/cm$^2$<br>Porosity of electrode: 62% | effect of improving overvoltage and discharging capacity even at an electrode having a low porosity of high loading.

The invention claimed is:

1. A method for preparing an iron sulfide ($FeS_2$) comprising the steps of:
   (1) mixing an iron precursor and a sulfur precursor to form a mixture; and
   (2) heat-treating the mixture in an inert gas atmosphere, wherein the iron precursor is γ-FeOOH, and
   wherein the iron sulfide ($FeS_2$) is in a form of plate-shaped particles.

2. The method for preparing the iron sulfide ($FeS_2$) according to claim 1, wherein the sulfur precursor is thiourea.

3. The method for preparing the iron sulfide ($FeS_2$) according to claim 1, wherein the mixing of step (1) is such that a molar ratio of iron (Fe) in the iron precursor to sulfur(S) in the sulfur precursor is 1:8 or more.

4. The method for preparing the iron sulfide ($FeS_2$) according to claim 1, wherein the heat-treating of step (2) is carried out at 400° C. to 600° C. for 1 hour to 3 hours in the inert gas atmosphere in a state such that the heat-treating occurs in a reactor (a) comprising the inert gas, or (b) in which the inert gas is continuously introduced, and a temperature increase rate is controlled in the range of 5° C. to 20° C. per minute.

5. The method for preparing the iron sulfide ($FeS_2$) according to claim 4, wherein the inert gas is selected from the group consisting of nitrogen, argon, helium, and mixtures thereof.

6. A positive electrode for a lithium secondary battery comprising an active material, an electrically conductive material, a binder, and an iron sulfide ($FeS_2$) prepared according to the method of claim 1.

7. The positive electrode for the lithium secondary battery according to claim 6, wherein the iron sulfide ($FeS_2$) is in a form of plate-shaped particles.

8. The positive electrode for the lithium secondary battery according to claim 6, wherein a content of the iron sulfide ($FeS_2$) is 0.1 parts by weight to 15 parts by weight relative to 100 parts by weight of base solids contained in the active material, the electrically conductive material, and the binder.

9. The positive electrode for the lithium secondary battery according to claim 6, wherein the iron sulfide ($FeS_2$) is in a form of particles having an average particle diameter of 0.1 μm to 10 μm.

10. The positive electrode for the lithium secondary battery according to claim 6, wherein the iron sulfide ($FeS_2$) is crystalline.

11. The positive electrode for the lithium secondary battery according to claim 6, wherein the active material is a sulfur-carbon composite.

12. The positive electrode for the lithium secondary battery according to claim 11, wherein the sulfur-carbon composite has a sulfur content of 60 parts by weight to 90 parts by weight based on 100 parts by weight of the sulfur-carbon composite.

13. A lithium secondary battery comprising the positive electrode for the lithium secondary battery according to claim 6; a negative electrode; a separator interposed between the positive electrode and the negative electrode; and an electrolyte.

14. The positive electrode for the lithium secondary battery according to claim 10, wherein the crystalline iron sulfide ($FeS_2$) has a property such that under a X-ray diffraction analysis using CuKα rays, the XRD peaks of (111), (200), (210), (211), (220), (311), (222) and (321) planes are seen at 2θ=28.4±0.2°, 32.9±0.2°, 36.9±0.2°, 40.6±0.2°, 47.3±0.2°, 56.0±0.2°, 58.9±0.2°, 61.5±0.2°, and 64.0±0.2°, respectively.

* * * * *